(12) United States Patent
Schneider et al.

(10) Patent No.: US 10,592,166 B2
(45) Date of Patent: Mar. 17, 2020

(54) FAST INPUT/OUTPUT IN A CONTENT-ADDRESSABLE STORAGE ARCHITECTURE WITH PAGED METADATA

(71) Applicant: EMC IP Holding Company LLC, Hopkinton, MA (US)

(72) Inventors: Zvi Schneider, Tel Aviv (IL); Amitai Alkalay, Kadima (IL); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/052,037

(22) Filed: Aug. 1, 2018

(65) Prior Publication Data

US 2020/0042235 A1 Feb. 6, 2020

(51) Int. Cl.
*G06F 3/06* (2006.01)
*G06F 15/173* (2006.01)
*G06F 12/10* (2016.01)
*G06F 13/16* (2006.01)

(52) U.S. Cl.
CPC .......... *G06F 3/0659* (2013.01); *G06F 3/0619* (2013.01); *G06F 3/0673* (2013.01); *G06F 3/0689* (2013.01); *G06F 12/10* (2013.01); *G06F 13/1668* (2013.01); *G06F 15/17331* (2013.01); *G06F 2212/1032* (2013.01); *G06F 2212/657* (2013.01); *G06F 2213/28* (2013.01)

(58) Field of Classification Search
CPC .. G06F 13/1668; G06F 3/0659; G06F 3/0673; G06F 3/0619; G06F 3/0689; G06F 12/10; G06F 2212/1032; G06F 2212/657

USPC ......................................................... 711/105
See application file for complete search history.

(56) References Cited

U.S. PATENT DOCUMENTS

| | | | |
|---|---|---|---|
| 7,203,741 B2 | 4/2007 | Marco et al. |
| 7,719,443 B1 | 5/2010 | Natanzon |
| 7,840,536 B1 | 11/2010 | Ahal et al. |
| 7,840,662 B1 | 11/2010 | Natanzon |

(Continued)

OTHER PUBLICATIONS

U.S. Appl. No. 16/368,008, filed Mar. 28, 2019, Natanzon et al.

(Continued)

*Primary Examiner* — Hua J Song
(74) *Attorney, Agent, or Firm* — Daly, Crowley Mofford & Durkee, LLP (57) ABSTRACT

An aspect of minimizing read amplification IO where metadata is not in RAM includes reading a l_md_page and corresponding lp_md_page from a storage device in a dual distributed layered architecture. The l_md_page specifies a metadata page that persists in a SSD and having logical addresses of metadata, and the lp_md_page associates logical block addresses with corresponding physical locations for the metadata. An aspect further includes reading data for a redundant array of independent disks (RAID) stripe according to an associated physical offset in the lp_md_page, accessing a stripe counter from the lp_md_page, and comparing the stripe counter from the lp_md_page to a stripe counter held in memory. Upon determining the stripe counter from the lp_md_page is the same, an aspect further includes determining the data is valid and reading the data according to associated physical offset in the lp_md_page and while bypassing a data module for the data.

18 Claims, 9 Drawing Sheets

(56) References Cited

U.S. PATENT DOCUMENTS

| | | |
|---|---|---|
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,910 B1 | 6/2015 | Hallak et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,208,162 B1 | 12/2015 | Hallak et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,304,889 B1 | 4/2016 | Chen et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,106 B1 | 6/2016 | Ben-Moshe et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,396,243 B1 | 7/2016 | Halevi et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,442,941 B1 | 9/2016 | Luz et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |

(56) References Cited

U.S. PATENT DOCUMENTS

| | | |
|---|---|---|
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |
| 10,235,196 B1 | 3/2019 | Natanzon et al. |
| 10,235,247 B1 | 3/2019 | Natanzon et al. |
| 10,235,249 B1 | 3/2019 | Natanzon et al. |
| 10,235,252 B1 | 3/2019 | Lieberman et al. |
| 10,250,679 B1 | 4/2019 | Natanzon et al. |
| 10,255,137 B1 | 4/2019 | Panidis et al. |
| 10,255,291 B1 | 4/2019 | Natanzon et al. |
| 2012/0260021 A1 | 10/2012 | Rudelic |
| 2015/0212752 A1* | 7/2015 | Nemazie ............... G06F 3/0688 711/103 |

OTHER PUBLICATIONS

U.S. Notice of Allowance dated Apr. 17, 2019 for U.S. Appl. No. 15/970,243; 10 Pages.
U.S. Appl. No. 15/970,243, filed May 3, 2018, Schneider, et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/261,174, filed Jan. 29, 2019, Natanzon et al.

* cited by examiner

FAST INPUT/OUTPUT IN A CONTENT-ADDRESSABLE STORAGE ARCHITECTURE WITH PAGED METADATA

BACKGROUND

Storage systems provide content-based deduplicated data storage in which data block addresses may be generated from data content. As the costs of solid-state memory decrease, organizations can consider using systems that can store and process terabytes of data.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for fast IO in a content-addressable storage architecture with paged metadata in a storage system. The method includes reading a l_md_page and corresponding lp_md_page from a storage device in a dual distributed layered architecture. The l_md_page specifies a metadata page that persists in a SSD and having logical addresses of metadata, and the lp_md_page associates logical block addresses with corresponding physical locations for the metadata. The method further includes reading data for a redundant array of independent disks (RAID) stripe according to an associated physical offset in the lp_md_page, accessing a stripe counter from the lp_md_page, and comparing the stripe counter from the lp_md_page to a stripe counter held in memory. Upon determining the stripe counter from the lp_md_page is the same, the method further includes determining the data is valid and reading the data according to associated physical offset in the lp_md_page and while bypassing a data module for the data.

Another aspect may provide a system for fast IO in a content-addressable storage architecture with paged metadata in a storage system. The system includes a memory having computer-executable instructions and a processor. The processor executes the computer-executable instructions. When executed by the processor, the computer-executable instructions cause the processor to perform operations. The operations include reading a l_md_page and corresponding lp_md_page from a storage device in a dual distributed layered architecture. The l_md_page specifies a metadata page that persists in a SSD and having logical addresses of metadata, and the lp_md_page associates logical block addresses with corresponding physical locations for the metadata. The operations further include reading data for a redundant array of independent disks (RAID) stripe according to an associated physical offset in the lp_md_page, accessing a stripe counter from the lp_md_page, and comparing the stripe counter from the lp_md_page to a stripe counter held in memory. Upon determining the stripe counter from the lp_md_page is the same, the operations further include determining the data is valid and reading the data according to associated physical offset in the lp_md_page and while bypassing a data module for the data.

Another aspect may provide a computer program product embodied on a non-transitory computer readable medium. The computer program product includes instructions that, when executed by a computer, causes the computer to perform operations. The operations include reading a l_md_page and corresponding lp_md_page from a storage device in a dual distributed layered architecture. The l_md_page specifies a metadata page that persists in a SSD and having logical addresses of metadata, and the lp_md_page associates logical block addresses with corresponding physical locations for the metadata. The operations further include reading data for a redundant array of independent disks (RAID) stripe according to an associated physical offset in the lp_md_page, accessing a stripe counter from the lp_md_page, and comparing the stripe counter from the lp_md_page to a stripe counter held in memory. Upon determining the stripe counter from the lp_md_page is the same, the operations further include determining the data is valid and reading the data according to associated physical offset in the lp_md_page and while bypassing a data module for the data.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass., is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In some embodiments, logical block addressing" (LBA) refers to a linear addressing technique for specifying locations of blocks of data stored in storage system.

In certain embodiments, a RAID_stripe is a group of pages that are RAID self-consistent (data in a RAID_stripe can be recovered upon drive failure, independently of data residing on other RAID_stripes), and that RAID operation is performed atomically on this space. A RAID_stripe has stripe metadata (MD) associated with it describing it's type (usually the block size it supports).

In some embodiments, a demoted LBA/hash refers to a LBA or hash that is not in memory (e.g., RAM), and thus requires SSD read operations to load the metadata).

In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or InfiniBand.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1A:
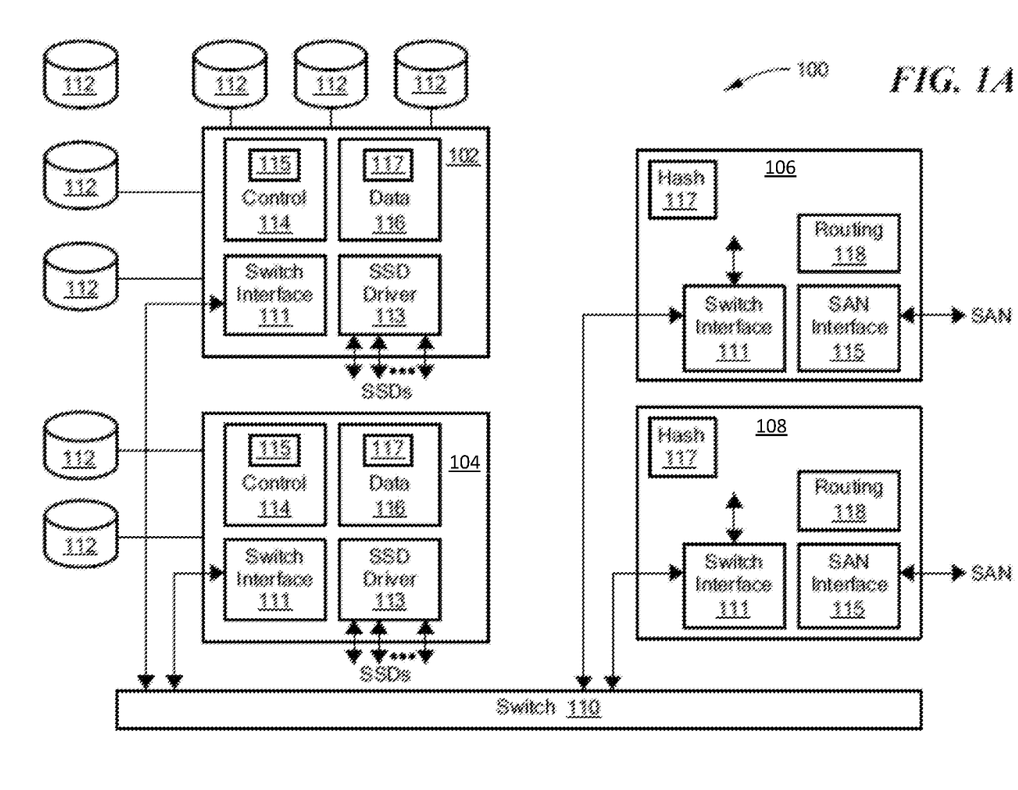
FIG. 1A is a block diagram of a content-based storage system having multi-level cache for deduplicated storage.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses, address hashes, and physical data location information and the D cache 117 can include, for each bucket, a filter, a hash to address, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 1B:
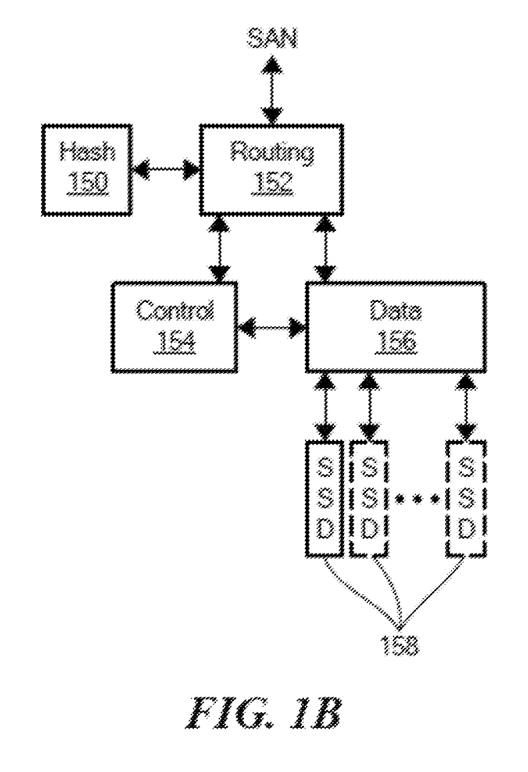
FIG. 1B illustrates further detail of the system of FIG. 1A.

FIG. 1B is an example of a system that can include a hash system 150 communicatively coupled to a routing system 152, which can be communicatively coupled to a control system 154 and a data system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

Figure 2:
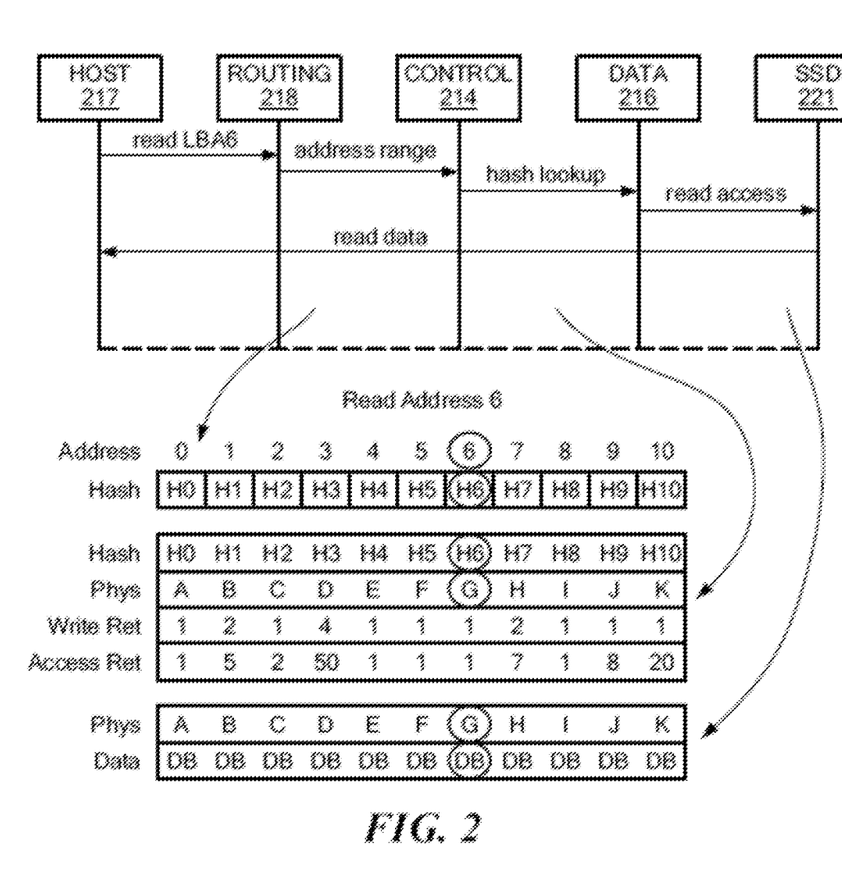
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup.

The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented.

If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
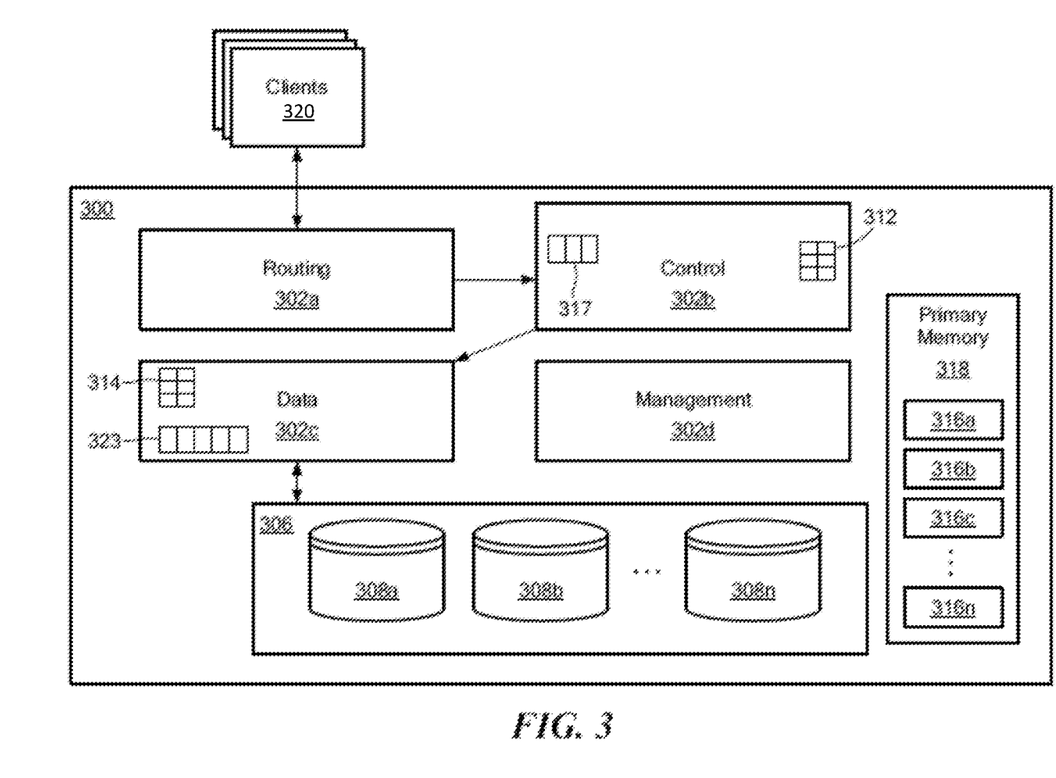
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between I/O addresses associated with data and the corresponding chunk hashes. As shown in FIG. 3, this mapping may be maintained using a data structure 312, referred to herein as an "I/O address to chunk hash mapping table" or "A2H table," (also known as A→H table) according to some embodiments. In one embodiment, I/O addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
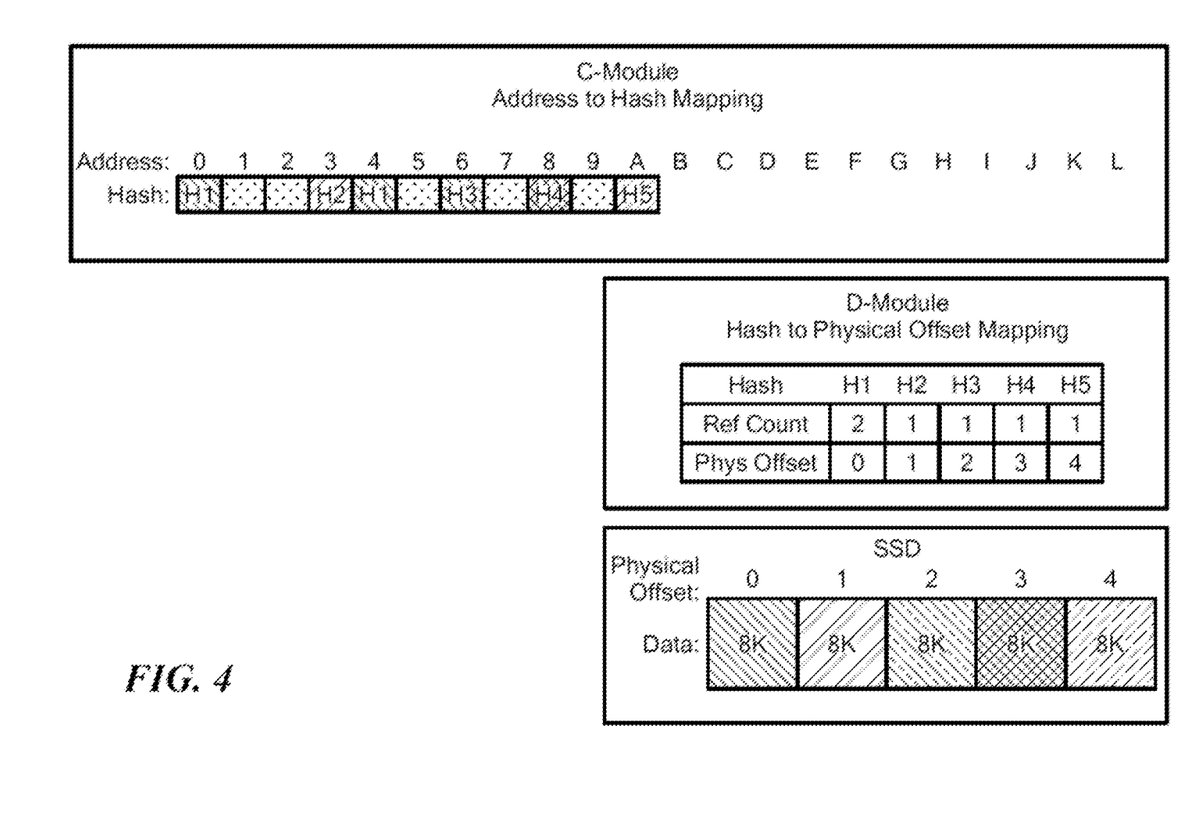
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Modern storage systems such as XtremIO leverage flash drives to provide fast reliable de-duplicated storage. Many of the systems keep the metadata for the system in memory to avoid accesses to the slower flash device, and keep metadata on the disk which requires at least one more access to the flash device, and in some cases multiple accesses to the flash device, which can significantly reduce the overall performance of the read operations significantly.

As indicated above, a deduplication storage system, such as XtremIO's CAS (Content Addressable Storage) has two layers for accessing the volume data, a first layer mapping from an address in the volume to the hash value of the data, and a second layer mapping from hash value to a location on the disk.

The address to hash mappings maps an address inside a volume to the hash value of its data. The metadata includes for each address the hash value of the content. If the basis of deduplication is 16 KB, for example, then the metadata for each address is the short hash value (6 bytes) of the data the address points to. In many cases access to the volume is in larger chunks than the size of the basic hash value. This means that the metadata for the address space can be easily cached, and standard prefetching algorithms can be effective.

In many of the cases accesses are sequential and there are also hot spots for access areas. A system can implement a cache for the metadata of the a→h table by using a simple LRU cache with prefetching of near metadata. One solution can be to keep the physical disk offset of the hash value along with the address to hash data; however, this is not possible when keeping the whole metadata in memory since the location on the disk consumes large amounts of memory.

But when keeping the metadata on the disk, the extra amount of metadata kept is not significant. The offset references will be held in the logical layer for demoted pages. This logical to offset will be built inline (during the Write Boost[the "cache" which is used to submit IO before doing the read modify write] (destage operation means the backend write)); thus, will not require any extensive operation.

For data loaded in the cache the physical offset is held since it is available once loaded. The means that every time there is a cache hit for the metadata in the A→H map there is no need to look for the location of the data matching the hash, as it will be immediately available.

Since the keeping the offset to the disk in the cache along with the hash value that matches the address may be relatively space consuming, for each offset in the cache the hash may be kept, or both the hash value along with the location on the disk is kept. Since data movement can also happen at the backend layer, the offset may not be accurate. This will be cached during the read and then the real address will be accessed.

The disadvantage of caching a→h data is that the same hash value can be cached multiple times, consuming significant amounts of memory. Write commands are not interesting in the a→h metadata, as with the new write comes a new hash value.

The hash to physical disk location includes for each hash key (6 bytes) the location on the disk and the reference count. Since the system is architected to keep hash keys of 6 bytes, there may be a collision of data generating the same hash. If there is a collision, a new hash key from a different hash address space is generated for that data, when the data is written. This means that the hash to physical disk location table must search for a hash value every time a new write arrives. If the write has the same hash value, there is a need to check the long hash value, and verify whether there is a hash collision, or if it is actually the same data. This means that during every write if the table is not in the system memory, there is a need to fetch the metadata of the hash from the disk and verify if such hash exists.

Caching the hash to physical location does not have the locality features of the a→h mapping. Data which is close in space usually has completely different hash values, which means that prefetching data for the cache is almost impossible from the hash space directly. The value of caching entries in the hash space is that if a hash value is popular, within a single entry we can hash for all their relevant volumes sharing the hash, and create a much more compact hash table.

Flash optimized RAID algorithms, such as XtremIO's XDP, may utilize random access capabilities of SSDs and may be implemented in lieu of an update algorithm. This approach minimizes unnecessary data movements and avoids the need for garbage collection (e.g., in contrast with log structure algorithms). This means that once data is allocated with physical location it will usually not be moved.

Each metadata layer needs to persist its metadata in SSDs in order to be highly available. The metadata is organized in pages, and those pages are written to the SSD's. Some systems attempt to group sequential addresses together into the same metadata page, in order to allow lower read amplification, when doing big IO (read/write). The following are denoted:

l_md_page:=LBA→hash MD pages
h_md_page:=Hash→Physical MD pages

Sequential addresses will be aggregated together into the same l_md_page.

As described above, many existing all-flash architectures, such as XtremIO's CAS, have a dual layer metadata structure, were the second layer is not LBA arranged (meaning no grouping or locality for sequential addresses). In case the system does not have enough RAM (or any at all) for holding the entire 2 metadata layers in memory, a solution is needed to allow fast datapath operations. Existing solutions work well given there is sufficient RAM for the cache. However, in case insufficient cache is available, or for workloads that are highly randomized, there may be a need to have several reads of metadata pages from drives for serving a single IO. For example, in XtremIO, the LBAs are arranged in a way that does provide locality for sequential LXA updates, thus a single SSD read will get all the metadata. However, in CAS, the metadata for each LBA is the hash signature, and this is distributed across different data modules, so to serve 512K read, with 16K native block, there will be 32 hashes, and accessing these 32 hashes might result in the worst case reading 32 pages from SSD's. This introduces significant read amplification.

Embodiments described herein provide a way to minimize read amplification in situations where both metadata are not in RAM for the CAS architecture, as well as other similar dual distributed layered architectures.

In some embodiments, new hardened metadata pages are provided, as well as a method to ensure data correctness for read operations. In addition, a new notion of per-stripe counter is introduced as:

stripe_cntr

In each data module an array of 2-4 bytes counter is defined that will have a counter for each RAID_stripe. As a raid stripe is usually relatively big, a large amount of RAM will not be needed to support large enough systems. In XtremIO, where a stripe is of size 16K*40*36 this translates to ~2-4:24,000,000 RAM to physical capacity. For each RAID_stripe, this counter starts from zero, and is increased only if there is data within that RAID_stripe that was moved. Moving data is done only if there is a rebuild, and data inside the stripe is recovered into another stripe, or there is a defrag that evacuated this stripe for a new block size write. The actual update of the counter is done before the data is moved. Reads/writes from and into a stripe do not change the counter. It is understood that the stripe index in the array is a subset of bits in the physical location of a page.

In some embodiments, new metadata pages are defined that associate LBAs with a physical location in a loosely coupled manner (e.g., the new metadata pages are not continually updated and are not relied on for correctness. In embodiments, the following is denoted:

lp_md_pages pages holding map LBA≈>Physical+stripe_cntr

The regular IO flow, in the 2 metadata layer architecture, involves writing the new data to the data module and getting back the hash signature for each LBA, and this data in turn updated into the l_md_pages.

The new write IO flow is modified by getting in the write response additional data, on top of the hash signature, that is the physical location of the data, and the associated stripe_cntr at the time of the write. Now, lp_md_page is generated reflecting the data for the same LBA set as the l_md_page, and these 2 pages are concatenated together and stored to SSDs. The concatenation is done in order to allow the ability to load in one command both the l_md_page and the lp_md_page associated with it. When IO accessing an LBA range that is demoted the relevant l_md_page is read together with the lp_md_page.

Figure 5:
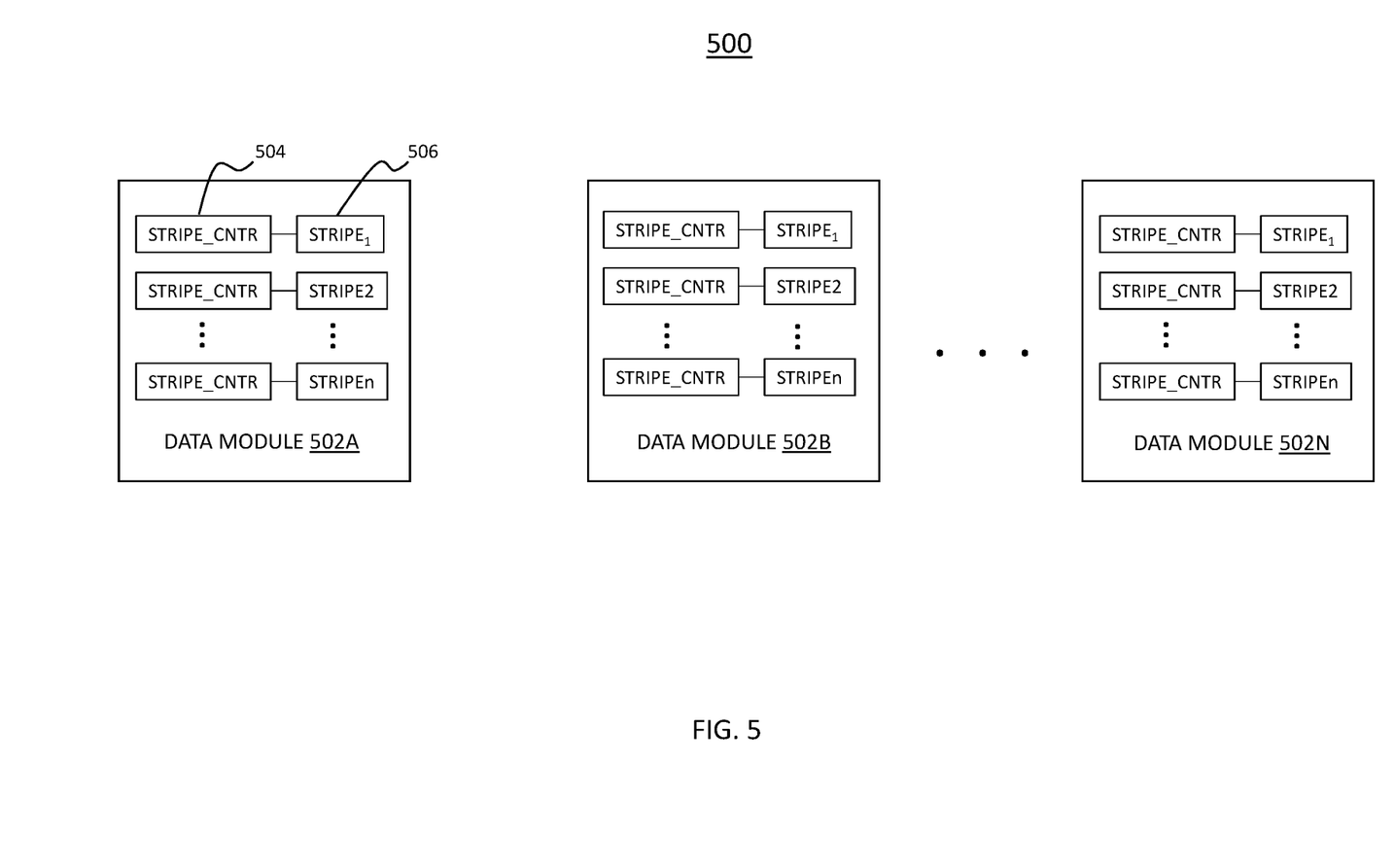
FIG. 5 is a block diagram depicting simplified D modules.
Figure 6:
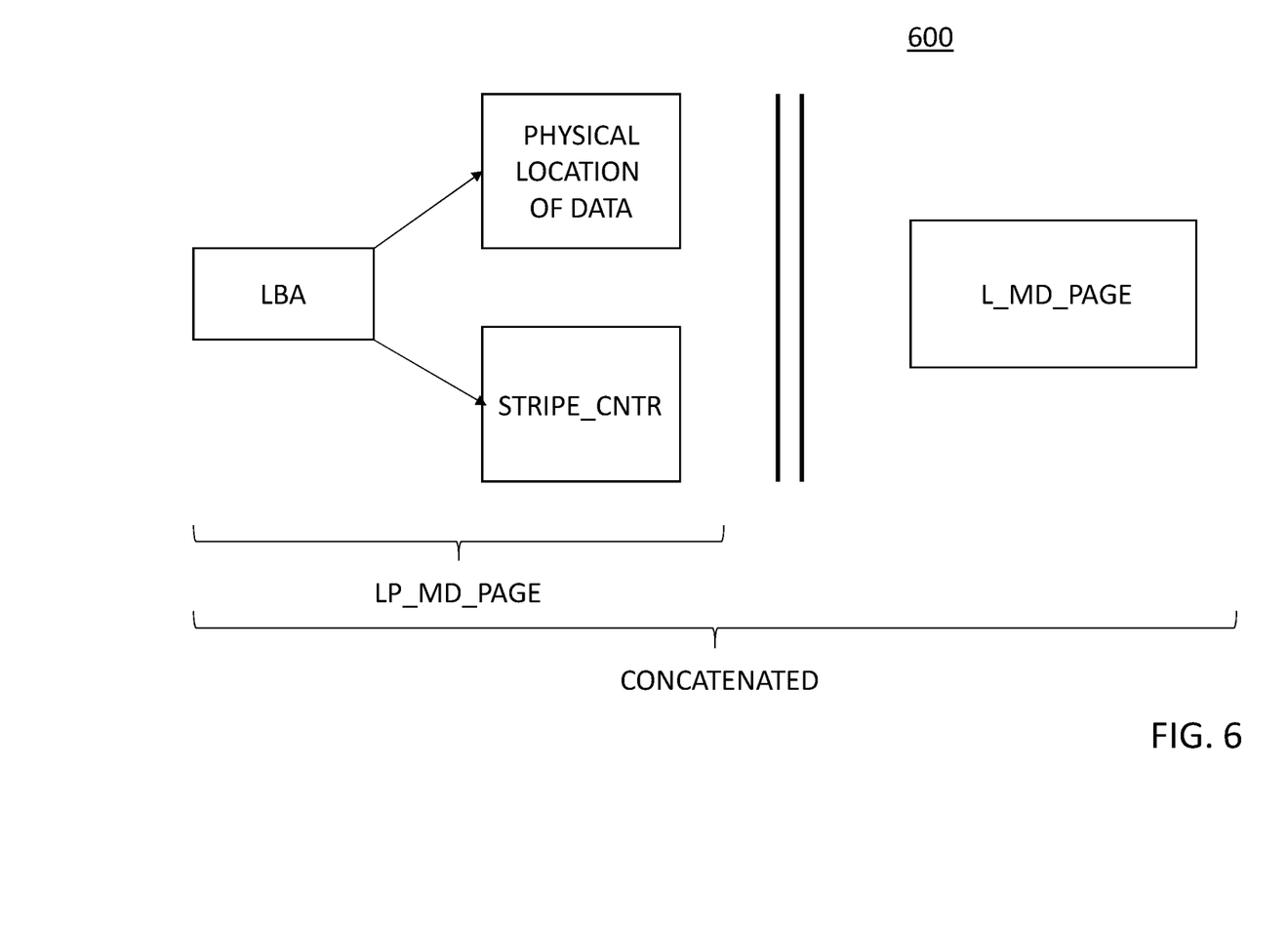
FIG. 6 is a diagram depicting mapping between metadata pages.

Turning now to FIGS. 5 and 6, the stripe_cntr and new lp_md_page will now be described. In the system of FIG. 5, a plurality of data modules (D modules) 502A-502N are shown (referred to collectively as data modules 502). Each data module 502 includes a stripe_cntr 504 for each RAID stripe 506 in the respective data module. As indicated above, in a non-limiting embodiment, the counter may be an array of 2-4 bytes. For each RAID_stripe 506, the stripe_cntr 504 begins at zero and increases when data within that stripe 504 has been moved. The stripe_cntr 506 is updated before the data is moved. As indicated above, reads/writes from and into a stripe 504 do not change the counter 506.

In FIG. 6, an lp_md_page is shown concatenated with a corresponding l_md_page. The lp_md_page maps LBA to both the physical data locations and corresponding stripe_cntr.

Figure 7:
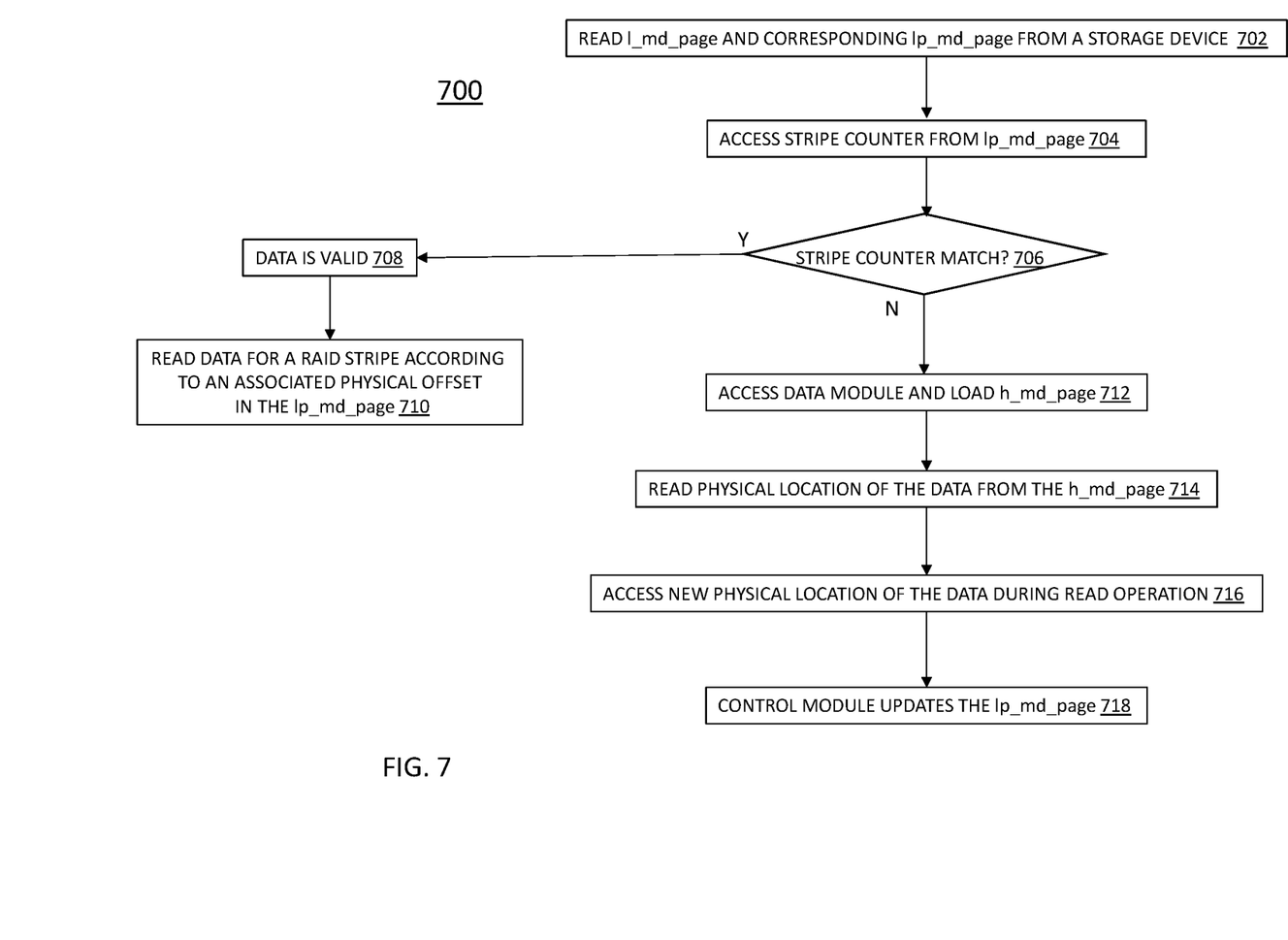
FIG. 7 is a flow diagram of a process for implementing fast IO in a content-addressable storage architecture with paged metadata.

Turning now to FIG. 7, an IO flow process 700 for a demoted LBA will now be described in accordance with an embodiment. An LBA is considered to be demoted when data has been moved from memory to disk. In block 702, the process 700 reads the l_md_page+lp_md_page (e.g., via a single IO request to the data module).

In block 704, the process 700 accesses the stripe_cntr from the lp_md_page by sending a request to the data module. In block 706, the process 700 compares the stripe_cntr from the lp_md_page to a stripe counter that is kept in memory to see if the one in memory (i.e., the actual counter) is the same as the one in the metadata page. If the stripe_cntr is the same, this means the data is valid (i.e., it is guaranteed that the data has not been moved and thus is identical to the written data because the counter has been updated before the data was moved in that stripe (e.g., in defrag/rebuild flows) in block 708. In this scenario, there is no need to access the D module to read the data. The data is read according to the associated physical offset in the lp_md_page in block 710.

If the stripe_cntr does not match in block 706, the data has potentially been moved and the lp_md_page is not up-to-date. In this instance, the process 700 accesses the data module in block 712 and loads the h_md_page to get the correct physical location in block 714. The C-module accesses the new physical location during the read operation in block 716 and updates the lp_md_page for the next access in block 718.

As indicated above some modern all flash architectures support NVMEoF for metadata to the backend drives from any controller in the cluster. Thus, the data can be read directly from the C module if it is known that the data did not move, thereby reducing the latency and CPU overhead associated with additional messaging hops.

In an alternative embodiment, a portion of the process (e.g., block 704) may be implemented by a remote direct memory access (RDMA) read from the array on the data module without involving the data module. RDMA refers to a technology that enables computers in a network to exchange data in main memory without involving a processor, cache, or operating system. In order to reduce hops in systems that have an RDMA interconnect, the stripe_ctr array memory for remote access may be mapped via RDMA. The C-module, after fetching the stripe_ctr from the lp_md_page, will do single RDMA read from the relevant offsets in the mapped memory, thereby reducing the overhead of this additional messaging hop to data module.

Figure 8:
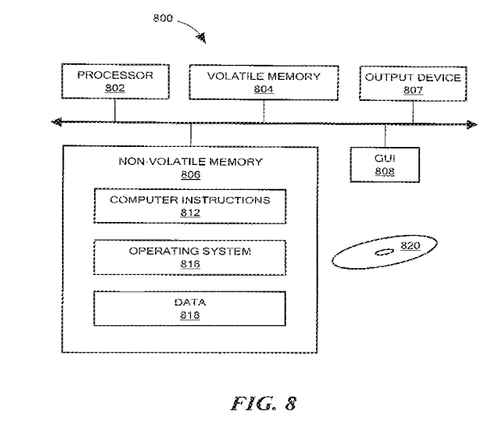
FIG. 8 is a block diagram of an illustrative computer that can perform at least a portion of the processing described herein.

FIG. 8 shows an exemplary computer 800 (e.g., physical or virtual) that can perform at least part of the processing described herein. The computer 800 includes a processor 802, a volatile memory 804, a non-volatile memory 806 (e.g., hard disk or flash), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for minimizing read amplification for input/output (IO) where metadata is not in random access memory (RAM), comprising:
    reading a l_md_page and corresponding lp_md_page from a storage device in a dual distributed layered architecture, the l_md_page specifies a metadata page that persists in a solid state drive and having logical addresses of metadata, and the lp_md_page associates logical block addresses (LBAs) with corresponding physical locations for the metadata;
    concatenating the l_md_page and the lp_md_page;
    storing the concatenated pages in the solid state disk;
    wherein reading the reading the l_md_page and the lp_md_page includes loading the concatenated pages in a single command;
    reading data for a redundant array of independent disks (RAID) stripe according to an associated physical offset in the lp_md_page;
    accessing a stripe counter from the lp_md_page;
    comparing the stripe counter from the lp_md_page to a stripe counter held in memory; and
    upon determining the stripe counter from the lp_md_page is the same:
    determining the data is valid; and
    reading the data according to associated physical offset in the lp_md_page and while bypassing a data module for the data.

2. The method of claim 1, wherein reading the l_md_page and the lp_md_page is performed by sending an input/output (IO) request to the data module.

3. The method of claim 1, wherein reading the l_md_page and the lp_md_page is performed by a direct non-volatile memory over fabric (NVMEoF) read from a control module to drives bypassing the data module, the reading performed if the data is determined to be correct.

4. The method of claim 1, wherein accessing the stripe counter is performed by sending a request to a data module.

5. The method of claim 1, wherein upon accessing the stripe counter the method includes reading a remote direct memory access (RDMA) read via an RDMA interconnect from relevant offset in mapped memory.

6. The method of claim 1, further comprising upon determining the
    stripe counter from the lp_md_page is not the same:
    accessing a data module and loading the h_md_page;
    reading a physical location of the data from the h_md_page;
    accessing by a control module, a new physical location of the data during a read operation; and
    updating, by the control module, the lp_md_page.

7. A system for minimizing read amplification for input/output (IO) where metadata is not in random access memory (RAM), comprising:
    a memory comprising computer-executable instructions; and
    a processor executing the computer-executable instructions, the computer-executable instructions when executed by the processor cause the processor to perform operations comprising:
    reading a l_md_page and corresponding lp_md_page from a storage device in a dual distributed layered architecture, the l_md_page specifies a metadata page that persists in a solid state drive and having logical addresses of metadata, and the lp_md_page associates logical block addresses (LBAs) with corresponding physical locations for the metadata;
    concatenating the l_md_page and the lp_md_page;
    storing the concatenated pages in the solid state disk;
    wherein reading the reading the l_md_page and the lp_md_page includes loading the concatenated pages in a single command;
    reading data for a redundant array of independent disks (RAID) stripe according to an associated physical offset in the lp_md_page;

accessing a stripe counter from the lp_md_page;
comparing the stripe counter from the lp_md_page to a stripe counter held in memory; and
upon determining the stripe counter from the lp_md_page is the same:
determining the data is valid; and
reading the data according to associated physical offset in the lp_md_page and while bypassing a data module for the data.

8. The system of claim 7, wherein reading the l_md_page and the lp_md_page is performed by sending an input/output (IO) request to the data module.

9. The system of claim 7, wherein reading the l_md_page and the lp_md_page is performed by a direct NVMEoF read from a control module to drives bypassing the data module, the reading performed if the data is determined to be correct.

10. The system of claim 7, wherein accessing the stripe counter is performed by sending a request to a data module.

11. The system of claim 7, wherein upon accessing the stripe counter, the operations further include reading an RDMA read via an RDMA interconnect from relevant offset in mapped memory.

12. The system of claim 7, wherein the operations further include upon determining the stripe counter from the lp_md_page is not the same:
accessing a data module and loading the h_md_page;
reading a physical location of the data from the h_md_page;
accessing by a control module, a new physical location of the data during a read operation; and
updating, by the control module, the lp_md_page.

13. A computer program product embodied on a non-transitory computer readable medium, the computer program product including instructions that, when executed by a computer causes the computer to perform operations comprising:
reading a l_md_page and corresponding lp_md_page from a storage device in a dual distributed layered architecture, the l_md_page specifies a metadata page that persists in a solid state drive and having logical addresses of metadata, and the lp_md_page associates logical block addresses (LBAs) with corresponding physical locations for the metadata;
concatenating the l_md_page and the lp_md_page;
storing the concatenated pages in the solid state disk;
wherein reading the reading the l_md_page and the lp_md_page includes loading the concatenated pages in a single command:
reading data for a redundant array of independent disks (RAID) stripe according to an associated physical offset in the lp_md_page;
accessing a stripe counter from the lp_md_page;
comparing the stripe counter to from the lp_md_page to a stripe counter held in memory; and
upon determining the stripe counter from the lp_md_page is the same:
determining the data is valid; and
reading the data according to associated physical offset in the lp_md_page and while bypassing a data module for the data.

14. The computer program product of claim 13, wherein reading the l_md_page and the lp_md_page is performed by sending an input/output (IO) request to the data module.

15. The computer program product of claim 13, wherein reading the l_md_page and the lp_md_page is performed by a direct NVMEoF read from a control module to drives bypassing the data module, the reading performed if the data is determined to be correct.

16. The computer program product of claim 13, wherein accessing the stripe counter is performed by sending a request to a data module.

17. The computer program product of claim 13, wherein upon accessing the stripe counter the operations further include reading an RDMA read via an RDMA interconnect from relevant offset in mapped memory.

18. The computer program product of claim 13, wherein the operations further include:
upon determining the stripe counter from the lp_md_page is not the same:
accessing a data module and loading the h_md_page;
reading a physical location of the data from the h_md_page;
accessing by a control module, a new physical location of the data during a read operation; and
updating, by the control module, the lp_md_page.

* * * * *